United States Patent [19]

Seliger et al.

[11] 4,353,928

[45] Oct. 12, 1982

[54] METHOD OF AND AN APPARATUS FOR TREATING FISH MATERIAL TO MAKE THE SAME READY FOR CONSUMPTION

[75] Inventors: Ewald Seliger; Klaus Dudar, both of Halle an der Saale; Günter Stöhr, Plauen; Rudolf Millner; Wilhelm Banse, both of Halle an der Saale, all of German Democratic Rep.

[73] Assignee: Veb Rationalisiering Halle, Halle, German Democratic Rep.

[21] Appl. No.: 854,747

[22] Filed: Nov. 25, 1977

[51] Int. Cl.³ .................... A23L 3/30; A23L 1/325
[52] U.S. Cl. ................................. 426/238; 426/643
[58] Field of Search ........................... 426/238, 643

[56] References Cited

U.S. PATENT DOCUMENTS

| 241,187 | 5/1881 | Brick | 426/643 |
|---|---|---|---|
| 2,538,310 | 1/1951 | Hansen | 426/643 X |
| 2,735,777 | 2/1956 | Meyer | 426/643 X |
| 2,881,079 | 4/1959 | Simijan | 426/238 |
| 2,980,537 | 4/1961 | Hagen | 426/238 |
| 3,100,710 | 8/1963 | Carlin | 426/641 X |
| 3,432,311 | 3/1969 | Gruner | 426/641 X |
| 3,711,896 | 1/1973 | Guberman et al. | 426/238 X |
| 3,743,523 | 7/1973 | Bodine | 426/238 |
| 4,075,357 | 2/1978 | Szczesniak et al. | 426/641 X |

FOREIGN PATENT DOCUMENTS 46-18580 5/1971 Japan .................................. 426/238

Primary Examiner—Robert A. Yoncoskie
Attorney, Agent, or Firm—Michael J. Striker

[57] ABSTRACT

Fish material, is immersed in a flavoring bath, and ultrasonic soundwaves are introduced into the flavoring bath to enhance the penetration of the flavoring bath into the fish material and also to tenderize the fish material. The treatment of the fish material may be performed in two different stages during each of which the intensity of the ultrasonic sound waves is different in the same bath or in succession in two flavoring baths each having a different composition. The treatment may be performed in a treatment vessel which contains the flavoring bath, or in a closed receptacle which is immersed in a body of liquid contained in an accommodating vessel.

13 Claims, 2 Drawing Figures

METHOD OF AND AN APPARATUS FOR TREATING FISH MATERIAL TO MAKE THE SAME READY FOR CONSUMPTION

BACKGROUND OF THE INVENTION

The present invention relates to a method of and an arrangement for treating fish material to make the same ready for consumption in general, and more particularly to salting and/or pickling and/or flavoring and tenderizing such fish material.

There are already known various methods of preparing fish for consumption, among them pickling, salting, or marinating the fish, whether in the form of whole fish or fish pieces of fish fillet. When the methods which have been specifically mentioned above are resorted to, the fish material is immersed in a flavoring bath including, for instance, salt and/or vinegar and/or other flavoring agents, such as carrots, onions, sugar, pepper, bay leaves or the corresponding essences. The fish material is kept in the flavoring bath for an extended period of time during which the flavoring bath penetrates into the tissue of the fish material and not only flavors the same, but also tenderizes such tissue. Because of the need for extending the period of treatment of the fish material by the flavoring bath over several days in the case of pickling or even over several weeks in the case of salting, these prior-art methods call for substantial expenditures not only in the terms of time involved, but also in the terms of equipment needed for accommodating the fish material immersed in the flavoring bath, and additionally also in terms of operating expenses inasmuch as the pickling or salting process must be constantly supervised and any deviations of the properties of the flavoring bath from the desired values must be promptly remedied.

It has been already proposed to somewhat expedite the above-discussed method by treating the fish material in the above-discussed manner but at an elevated temperature. However, it will be appreciated that the treatment at the elevated temperature increases the danger that the fish material may deteriorate or rot during the treatment thereof, particularly inasmuch as these elevated temperatures are conducive to the growth of mildew, fungi, bacteria and the like. Also, the considerably long treatment period brings about substantial losses in weight of fish material which may amount, depending on the fish material being treated, up to 27% of the original weight. A further disadvantage of these prior-art methods is that the possibilities of automation or mechanization of the treatment and further handling of the fish material are quite limited, especially in view of the substantial dwell times of the fish material in the flavoring bath which is needed for accomplishing the proper consistency and taste of the fish material.

Also, as a further disadvantageous result of the long treatment period, the possibilities of establishing, on a short-term basis, the best way of treating the fish material which is then available, for instance, by varying the treatment period, the composition of the flavoring bath, or the temperature at which the fish material is being treated, are very limited, being available only in a few exceptional cases so that the quality of the final product, that is, the treated fish material, will be almost exclusively determined by the experiences of the operating personnel and, therefore, it is very difficult, if not impossible to designedly influence the treatment processes.

On the other hand, it is also already known to improve the tenderness of meat by letting ultrasonic sound energy act thereon. In this connection, it has been already proposed to let the ultrasonic sound waves act on the meat either directly, or through the intermediary of a contact medium. However, to avoid the danger of losing the meat juices through too high dripping losses or through excessive interchange between the contact medium and the meat tissue, the meat pieces have to be treated in a frozen condition. This, of course, involves substantial expenses and renders this method rather cumbersome.

SUMMARY OF THE INVENTION

Accordingly, it is a general object of the present invention to avoid the above-discussed disadvantages of the prior art.

More particularly, it is an object of the present invention to develop a method of treating fish material to make the same ready for consumption which is not possessed of the above-discussed disadvantages of the prior-art treatment methods.

It is another object of the present invention to device a method of the above-discussed type which renders it possible to considerably reduce the treatment period while maintaining high quality of the final fish material.

A still further object of the present invention is to provide a treatment method which renders it possible to establish, on a short-term basis, the properties of the fish material being treated and to influence the final properties of the fish material by changing the treatment conditions.

An additional object of the present invention is to furnish a method which renders it possible to keep the losses in weight of fish material during dwelling in the flavoring bath to a minimum.

A concomitant object of the present invention is to design an apparatus which is capable of performing the above-discussed method.

It is yet another object of the present invention to so construct the apparatus as to avoid the disadvantages of the prior-art apparatus of this type.

Finally, it is an object of the present invention to develop an apparatus of the above-mentioned type which is simple in construction, inexpensive to manufacture and operate, and reliable nevertheless.

In persuance of these objects and others which may become apparent hereafter, one feature of the present invention resides, briefly stated, in a method of treating fish material to make the same ready for consumption, which method comprises the steps of preparing a flavoring bath; accommodating the fish material to be treated in the flavoring bath; and subjecting the flavoring bath to ultrasonic sound waves for the latter to be transmitted through the flavoring bath to the fish material to enhance the penetration of the flavoring bath into the fish material and also to tenderize the latter. Advantageously, the flavoring bath has a common salt content of 3.5 to 12% and a vinegar content of 1.5 to 7%, and also includes seasoning agents, and other flavoring agents. Advantageously, the ratio of the fish material to the flavoring bath is kept between 2:1 and 1:2, depending on the fish material being treated. The frequency of the ultrasonic sound waves is advantageously in a frequency range between 20 and 50 kHz, preferably 40 kHz, and the ultrasonic sound waves have an intensity of up to 2 W/cm². The action of the ultrasonic sound waves is advantageously continued for between 0.5 and 5 hours.

According to a further advantageous concept of the present invention, the fish material accommodated in the flavoring bath is agitated at least during the subjecting step. Also, to advantage, the temperature of the flavoring bath is maintained in a temperature range between 10° and 20° C. at least during the subjecting step.

The treatment of the fish material may take place in an open container which accommodates both the treating bath and the fish material. However, it is also possible and contemplated by the present invention to confine both the flavoring bath and the fish material to be treated in a closed receptacle which is then submerged in a body of liquid into which the ultrasonic sound waves are emitted for the ultrasonic sound waves to propagate through the liquid body toward and into the closed receptacle. To improve the action of the ultrasonic sound waves on the fish material confined in the receptacle, the fish material is agitated by turning the closed receptacle within the liquid body at least during the subjecting step. Advantageously, the liquid body simultaneously serves as a cooling medium which maintains the temperature of the contents of the closed receptacle within a predetermined temperature range at least during the subjecting step.

According to a further currently preferred aspect of the present invention, the above-mentioned flavoring bath has a common salt concentration of between 3.5 and 20% and the action of the ultrasonic sound waves on the fish material is continued for a time period sufficient for the fish material to obtain predetermined properties. Then, the thus preliminarily treated fish material is transferred into another flavoring bath having a vinegar concentration of between 4 and 8% and the other flavoring bath and the fish material accommodated therein are also subjected to the action of the ultrasonic sound waves to finish the treatment of the fish material. Under these circumstances, both treatments can be performed in open vessels or in a closed receptacle, or one in an open vessel and the other in a closed receptacle.

In accordance with a further currently preferred aspect of the present invention, the subjecting step includes exposing the flavoring bath and the fish material accommodated therein to ultrasonic sound waves at least in two stages the duration of each of which and the intensity of the ultrasonic sound waves during each of which depend on the properties of the fish material at the outset of the treatment or during the treatment.

Another feature of the present invention resides in an arrangement for treating fish material to make the same ready for consumption, which arrangement comprises container means for accommodating the fish material to be treated in a flavoring bath; and means for transmitting ultrasonic sound waves into the flavoring bath for the ultrasonic sound waves to propagate through the flavoring bath to the fish material to enhance the penetration of the flavoring bath into the fish material and also to tenderize the latter. The container means may include an oscillatory vessel, and the transmitting means may include at least one ultrasonic sound generator and at least one ultrasonic sound transducer mounted on the vessel and operative for emitting the ultrasonic sound waves into the flavoring bath.

The arrangement of the present invention may, to advantage, further comprise means for agitating the fish material in the flavoring bath, including a drum which is permeable to the flavoring bath and impermeable to the fish material and has at least one closeable opening for the introduction thereinto and withdrawal therefrom of the fish material, means for mounting the drum in the vessel for movement relative thereto, and means for moving the drum, such as means for rotating the drum when the mounting means mounts the drum for rotation.

It is further proposed by the present invention for the arrangement to comprise means for controlling the composition and the amount of the flavoring bath in the vessel, such controlling means including inlet and outlet pipes for the flavoring bath. Furthermore, as currently contemplated, the arrangement will comprise means for maintaining the temperature of the flavoring bath within predetermined limits.

Instead of being treated in an open vat or vessel, the fish material may be confined, together with the flavoring bath, in a closed receptacle. Then, the container means includes an oscillatory vessel for receiving the receptacle immersed in a body of liquid, and the transmitting means includes at least one ultrasonic sound generator and at least one ultrasonic sound transducer mounted on the vessel and operative for emitting the ultrasonic sound waves into the liquid body for the ultrasonic sound waves to propagate through the latter and into the receptacle to act on the flavoring bath and the fish material confined therein.

To agitate the fish material in the flavoring bath under these circumstances, that is, when the fish material and the flavoring bath are confined in the closed receptacle, it is advantageous to support the receptacle on at least two rollers at least one of which is rotated in order to set the receptacle into a turning motion as a result of which the fish material confined in the receptacle is intermixed.

In order to maintain the temperature of the contents of the receptacle within predetermined limits, the arrangement includes means for controlling the temperature of the liquid body, such as means for circulating the liquid body into and out of the vessel.

Advantageously, the arrangement includes at least two separate compartments each for accommodating a flavoring bath of a different composition each of which is acted upon by the transmitting means for the fish material to be sequentially treated in the two different flavoring baths. Advantageously, the arrangement of the present invention further comprises means for performing the treatment of the fish material in at least two stages of different intensities of the ultrasonic sound waves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
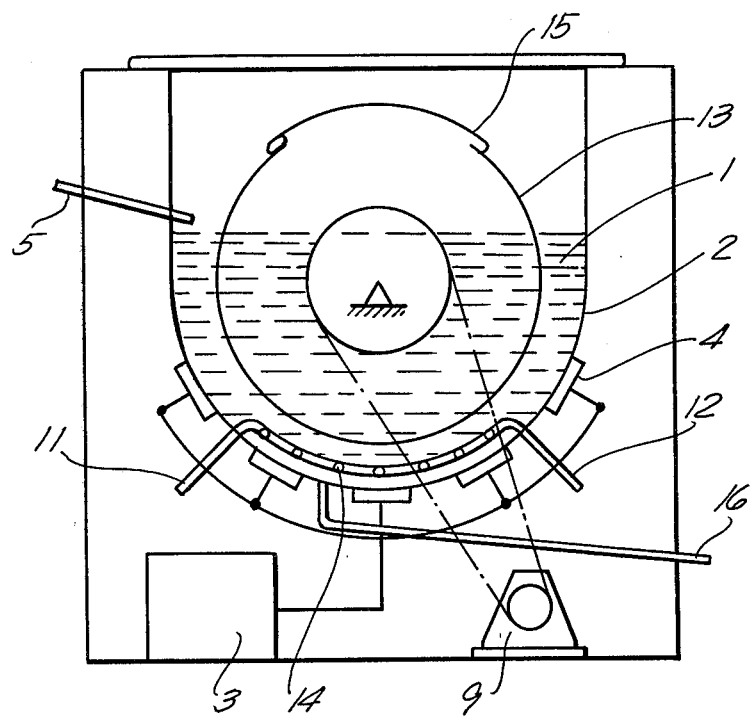
FIG. 1 is a somewhat diagrammatic side elevation view of the arrangement of the present invention as used for treating the fish material in an open manner.

Referring now to the drawing in detail, and first to FIG. 1 thereof, it may be seen therein that it illustrates an arrangement for performing the method of the present invention in an open system. The arrangement includes an oscillatory vessel 2 which is equipped, in a conventional manner, with supersonic sound transducers 4. The ultrasonic sound energy which is needed for the treatment is derived from ultrasonic sound generators 3 and conducted to the ultrasonic sound transducers 4.

The oscillatory vessel 2 is equipped with a drum 13 which is driven in rotation by a drive 9. The drum 13 has a closure 15 through which fish material, such as whole fish or fish pieces, such as fish fillet, can be introduced into, and the treated fish material can be withdrawn from, the interior of the drum 13. The oscillating vessel 2 will be filled with a flavoring liquid 1 during the operation of the arrangement, and the drum 13 is permeable to the treating or flavoring liquid 1 but impermeable to the fish material so that the latter is confined in the interior of the drum 13 but the flavoring liquid 1 can penetrate into and out of the drum 13. The fish material which is to be treated is introduced, at the beginning of the treating operation, into the interior of the drum 13 through the opening associated with the closure 15 so that it will be accommodated in the flavoring liquid 1 either to begin with, provided that the vessel 2 has been filled with the flavoring liquid 1 prior to the introduction of the fish material into the drum 13, or subsequently to the filling of the vessel 2 with the flavoring liquid 1 if the introduction of the flavoring liquid 1 takes place after the filling of the drum 13 with the fish material. When reference is being had to flavoring liquid or flavoring bath 1, it is to be understood that this may be a pure brine or saline solution, or pure vinegar or solution of acetic acid in water, or a solution, suspension or emulsion of a more complex composition including any or all of common salt, vinegar, sugar, pepper, onions, bay leaves, mustard seeds, the essences of above, and/or any other ingredients capable of influencing the taste of the treated fish material in a desirable manner.

After the filling of the drum 13, and the closing of the opening of the drum 13 by the closure 15, the drum 13 is set into a slow rotation by the drive 9 and the ultrasonic sound generators are energized so that the ultrasonic sound transducers 4 emit ultrasonic sound waves into the flavoring bed 1. Under these circumstances, the flavoring liquid 1 serves not only to flavor the fish material, but also simultaneously as a transmission medium for the energy of the ultrasonic sound waves. As a result of the action of the ultrasonic sound waves on the fish material, the tissue of the latter is loosened so that a substantial improvement in the tenderness of this tissue is obtained. In addition thereto, the ultrasonic sound waves act on the flavoring bath and on the flavoring ingredients thereof so as to enhance the penetration into the tissue of the fish material.

As further illustrated in FIG. 1, the treating vessel 1 is equipped with an inlet pipe 5 and an outlet pipe 6 which respectively serve to introduce the flavoring liquid 1 into and withdrawing such flavoring liquid 1 from the interior of the oscillatory vessel 2. Furthermore, there is provided a cooling arrangement 14 equipped with an inlet pipe 11 and an outlet pipe 12 through which a cooling medium is respectively admitted into and discharged from the cooling arrangement 14. The cooling arrangement 14 is operative for maintaining the temperature of the flavoring bath 1 within a predetermined temperature range, such as between 10° and 20° C.

The ultrasonic sound generators 3 and the ultrasonic sound transducers 4 are preferably operated in a 20 to 50 kHz, preferably at 40 kHz, the intensity of the ultrasonic sound waves being up to 2 W/cm². The treatment is continued, depending on the type and quality of the fish material, for 0.5 to 5 hours, this time period being also dependent on the ratio of the fish material to the flavoring liquid 1 which is advantageously kept between 1:2 and 2:1.

Advantageous results in pickling the fish material are obtained, again depending on the type of the fish material and also depending on the taste which is to be obtained for the final product or treated fish material, especially when the flavoring liquid 1 has a common salt content of between 3.5 and 12% and a vinegar content of 1.5 to 7%. Of course, the various parameters mentioned above can be varied in dependence on the properties of the particular fish material, to thereby vary the degree of saturation of the fish material with the flavoring agents as well as to alter the other qualities of the fish material in predetermined limits. The different properties of the fish material are caused, on the one hand, by natural causes in dependence on the particular type of fish to be treated and, on the other hand, by the state of the fish material, that is, whether the fish material consists of whole fish or of fish pieces or fillets, on the fact whether the fish tissue is frozen or not, and the like.

EXAMPLE 1

Advantageous properties, such as tenderness, and an excellent taste have been obtained when herring fillet has been treated in accordance with the present invention by operating the apparatus of FIG. 1 in accordance with the following parameters:
Frequency of the supersonic sound waves: 38 kHz
Intensity of the ultrasonic sound waves: 0.5 W/cm²
Duration of treatment: 2 h
Temperature of flavoring bath: 15° C.
Composition of flavoring bath: 2.5% acid, 4% NaCl
Ratio Fish:Bath: 1:1

It has been established that it is especially advantageous when the method of the present invention is performed in such a manner that the treatment of the fish material is conducted in two or more stages; then, the intensity of the ultrasonic sound waves will be varied from one of the stages to the other, and even the period of treatment may be different for each of the stages. This brings about the advantage that, inasmuch as the state of the fish material can be relatively quickly tested in the interim between the two stages, it is possible to control the duration and the intensity in the following stage in dependence on the state of the fish material which has been obtained while the fish material has been treated in the first stage.

EXAMPLE 2

Herring fillet has been preliminarily treated in accordance with the parameters listed in Example 1, except for the duration which was 90 minutes. After the completion of this first stage, the same fish material has been further treated in accordance with the parameters of Example 1 except that the intensity of the ultrasonic sound waves was now 0.2 W/cm², for 210 minutes.

There was achieved an excellent quality and taste of the final product and the losses in weight of the fish material have been reduced by 5%.

The ultrasonic sound treatment discussed above can also be combined with a conventional treatment, such as salination or pickling, that is, without resorting to the use of ultrasonic sound waves. Preferably, the conventional treatment is performed subsequently to the novel ultrasonic sound treatment.

Figure 2:
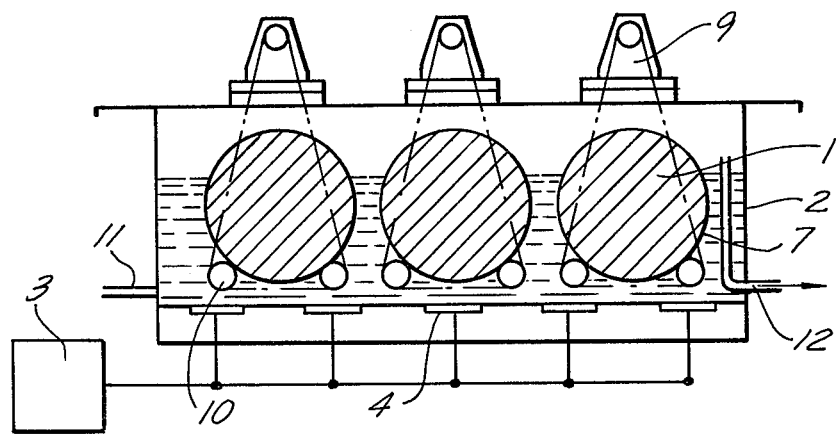
FIG. 2 is a view similar to FIG. 1 but illustrating the treatment of the fish material confined in closed containers.

Referring now to FIG. 2, it may be seen that the fish material to be treated is accommodated in receptacles 7, such as barrels, the receptacles 7 being closed and, in fact, these receptacles 7 may be the containers in which the treated fish material is delivered to the ultimate users. Under these circumstances, the barrels or receptacles 7 confine the fish material and the flavoring bath 1 in a predetermined ratio to one another. To agitate the fish material being treated, the barrels 7 are supported on rollers 10 which are driven in rotation by a conventional drive 9, the rollers 10 setting the respective receptacles 7 into slow rotation.

For the transmission of the ultrasonic sound waves from the ultrasonic sound transducers 4 energized by the ultrasonic sound generators 3, to the barrels or receptacles 7, the oscillatory vessel 2 is filled with a liquid medium which, in addition to serving for the transmission from the transducers 4 to the receptacles 7, also serves for cooling the receptacles 7. Because of its advantageous sound impedance values and high heat capacity, water is a very advantageous liquid medium. After reaching the receptacles 7, the ultrasonic sound waves penetrate through the walls of the receptacles 7 into the interiors thereof without any substantial energy losses so that there is no need for resorting to any additional measures for increasing the intensity of the ultrasonic sound waves.

As a result of a suitable control of the filling degree of the interior of the treating vessel 2, especially by withdrawing the high-temperature liquid 8 through the discharge pipe 12, and by replenishing the liquid 8 through the admission pipe 11, the temperature of the fish material being treated can be maintained at a predetermined, constant value.

The present invention also contemplates a possibility which has not been illustrated in the drawing in that it involves only duplication of the arrangements illustrated either in FIG. 1 or FIG. 2 . This possibility resides in the fact that the material is transferred in sequence between two or more flavoring baths of different compositions to be sequentially treated therein in the above-discussed manner. So, for instance, a first one of such flavoring baths may have a common salt concentration of between 3.5 and 20% and a second subsequent flavoring bath may have a vinegar concentration of between 4 and 8%. Of course, each of the baths may also have other flavoring ingredients in addition to the common salt and vinegar, respectively.

It will be understood that each of the elements described above, or two or more together, may also find a useful application in other types of constructions differing from the types described above.

While the invention has been illustrated and described as embodied in a method of and an arrangement for ultrasonically treating fish material to make the same ready for consumption, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of treating fish material to make the same ready for consumption, comprising the steps of preparing a flavoring bath; accommodating the fish material to be treated in the flavoring bath; and subjecting the flavoring bath to ultrasonic sound waves for the latter to be transmitted through the flavoring bath to the fish material to enhance the penetration of the flavoring bath into the fish material and also to tenderize the latter.

2. A method as defined in claim 1, wherein said preparing step includes giving the flavoring bath a common salt content of 3.5 to 12% and a vinegar content of 1.5 to 7%.

3. A method as defined in claim 2, wherein said preparing step further includes adding seasoning agents to the flavoring bath.

4. A method as defined in claim 1, wherein said accommodating step includes keeping the ratio of the fish material to the flavoring bath between 2:1 and 1:2.

5. A method as defined in claim 1, wherein said subjecting step includes exposing the flavoring bath and the fish material accommodated therein to ultrasonic sound waves in a frequency range between 20 and 50 kHz and of an intensity of up to 2 W/cm².

6. A method as defined in claim 5, wherein said subjecting step includes continuing the action of the ultrasonic sound waves for between 0.5 and 5 hours.

7. A method as defined in claim 1; and further comprising the step of agitating the fish material accommodated in the flavoring bath at least during said subjecting step.

8. A method as defined in claim 1; and further comprising the step of maintaining the temperature of the flavoring bath in a temperature range between 10° and 20° C. at least during said subjecting step.

9. A method as defined in claim 1, wherein said accommodating step includes confining both the flavoring bath and the fish material to be treated in a closed receptacle; and wherein said subjecting step includes submerging the closed receptacle in a body of liquid; and emitting ultrasonic sound waves into said liquid body for the ultrasonic sound waves to propagate therethrough toward and into the closed receptacle.

10. A method as defined in claim 9; and further comprising the step of turning the closed receptacle within the liquid body at least during the subjecting step to agitate the fish material confined within the closed receptacle.

11. A method as defined in claim 9; and further comprising the step of utilizing the liquid body for maintaining the temperature of the contents of the closed receptacle within a predetermined temperature range at least during said subjecting step.

12. A method as defined in claim 1, wherein said preparing step includes giving the flavoring bath a common salt concentration of between 3.5 and 20%, said subjecting step serves as a preliminary treatment, and further comprising the steps of transferring the preliminary treated fish material into a second flavoring bath having a vinegar concentration of between about 4 and 8%, and repeating said subjecting step with respect to the second flavoring bath and the fish material accommodated therein.

13. A method as defined in claim 1, wherein said subjecting step includes exposing the flavoring bath and the fish material accommodated therein to ultrasonic sound waves at least in two stages, the duration of each of which and the intensity of the ultrasonic sound waves during each of which may be varied depending upon the type and physical state of the fish material.

* * * * *